May 7, 1940. P. J. KROLL 2,199,524
VEHICLE LIFTING APPARATUS
Filed Jan. 23, 1939 2 Sheets-Sheet 1
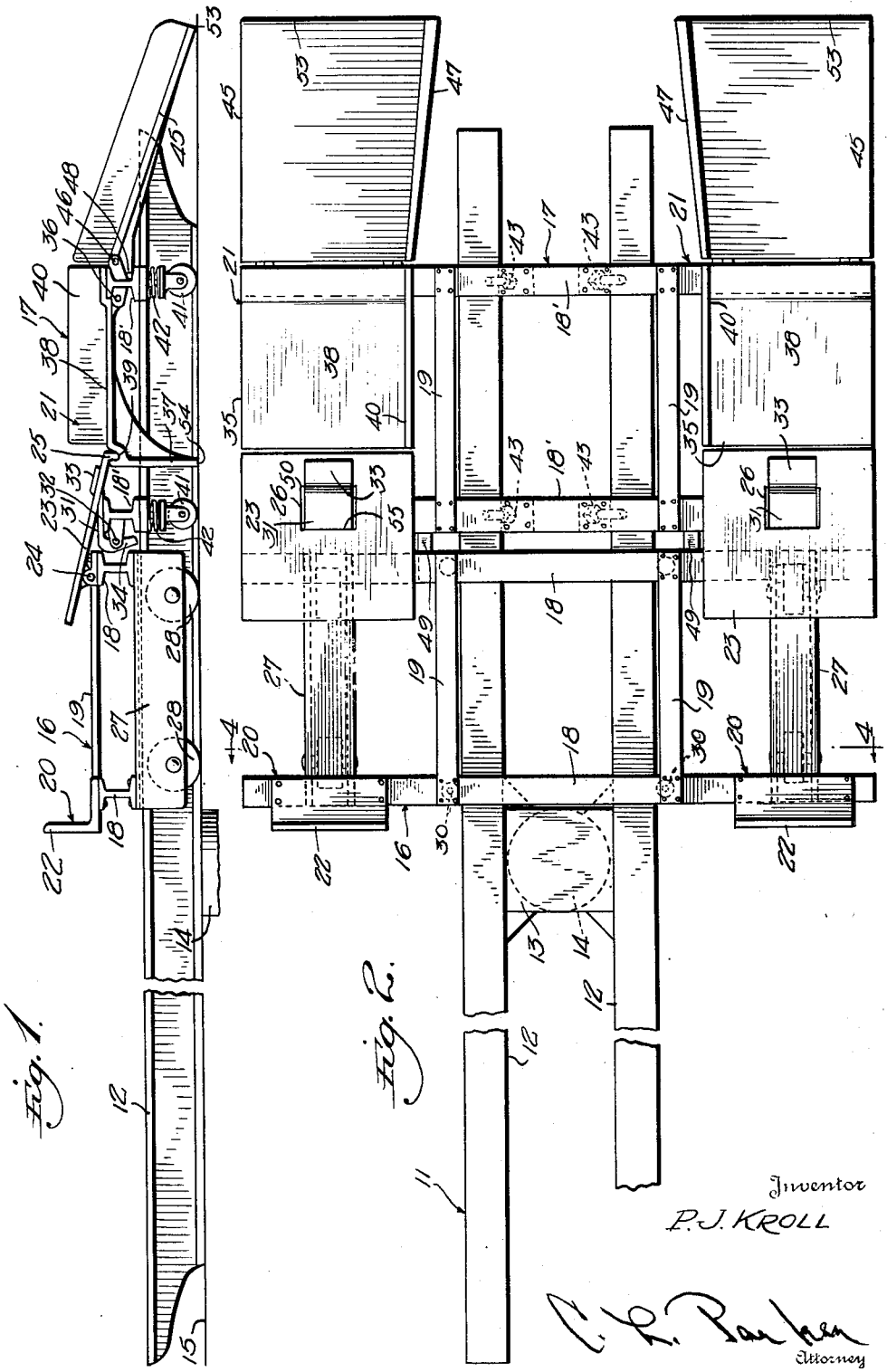
Inventor
P. J. KROLL
Attorney May 7, 1940.   P. J. KROLL   2,199,524
VEHICLE LIFTING APPARATUS
Filed Jan. 23, 1939   2 Sheets-Sheet 2
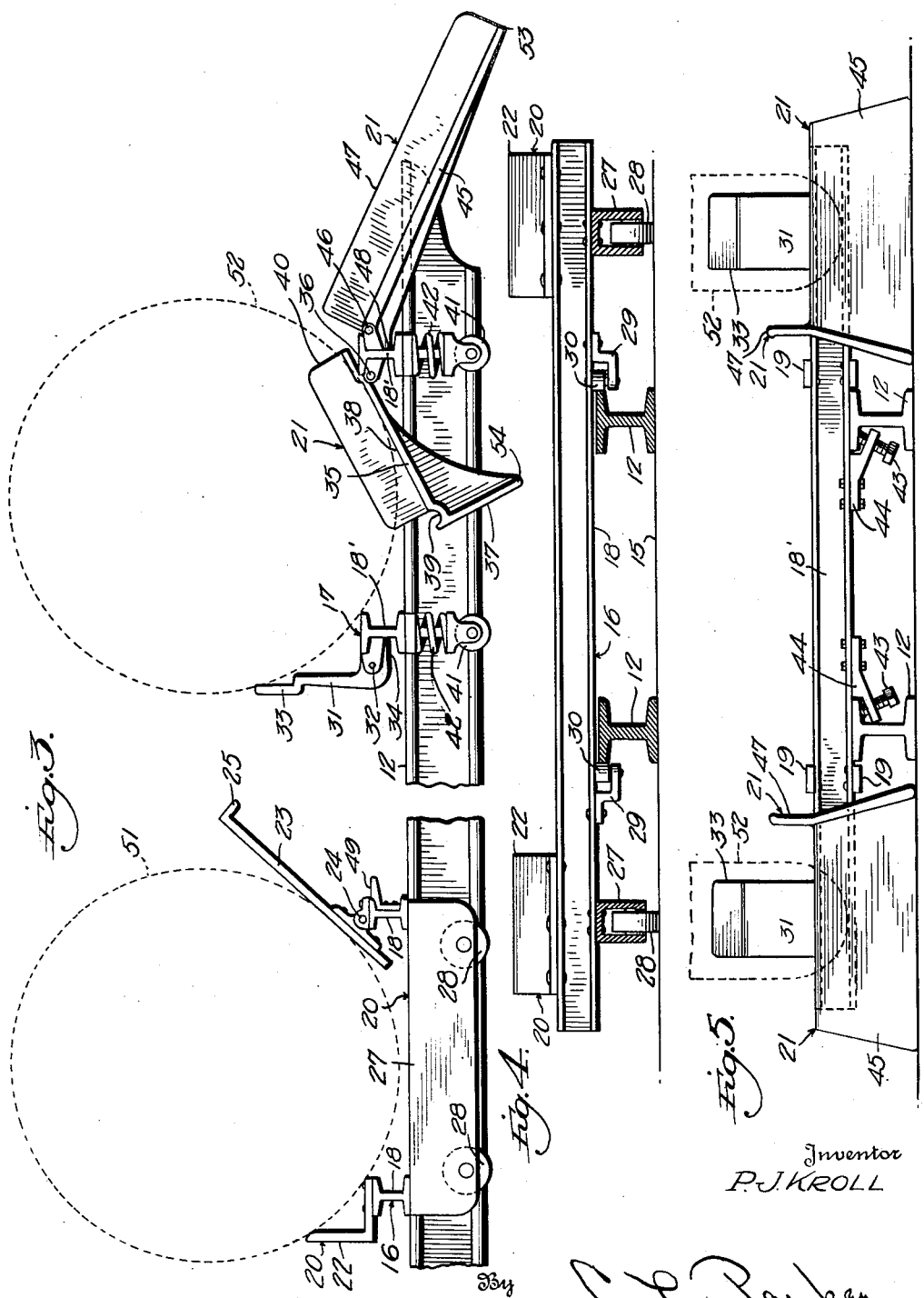
Inventor
P. J. KROLL Patented May 7, 1940

2,199,524

UNITED STATES PATENT OFFICE 2,199,524

VEHICLE LIFTING APPARATUS

Philip J. Kroll, New Orleans, La., assignor to Marjorie Kroll, Cambridge, Mass.

Application January 23, 1939, Serial No. 252,483

25 Claims. (Cl. 254—89)

This invention relates to vehicle lifting apparatus and more particularly to apparatus for converting a vehicle lift of the "free wheel" type into a vehicle lift of the "run on" type.

Vehicle lifting apparatus of the "free wheel" type having a pair of parallel supporting rails engageable with the axles of a motor vehicle whereby an upward lifting movement may be imparted to the vehicle is well known. Another well known type of lifting apparatus is the "run on" type having a pair of parallel wheel run-ways through which lifting movement is imparted to the vehicle directly through the wheels of the vehicle. Both types of lifting apparatus are desirable for certain kinds of work but, in many cases, lifting apparatus of the "run on" type is more desirable than lifing apparatus of the "free wheel" type.

In the case of vehicle lifting apparatus of the "free wheel" type, a pair of parallel supporting rails spaced apart a distance substantially less than the gauge or distance between the vehicle wheels are provided for engagement with the vehicle axles or other substantially rigid parts of the vehicle. Accordingly, the wheels and a substantial portion of the weight of the car overhang the supporting rails by which the vehicle is lifted. If the vehicle is not properly centered with respect to the rails, there is considerable danger present due to the fact that the vehicle may readily become unbalanced and knocked from the lift by a person working on the car. This danger is greatly enhanced by the use of rocking apparatus commonly used when lubricating a vehicle.

Moreover, with the introduction of individual wheel suspension eliminating the rigid axle in motor vehicles, the usefulness of this type of lift for a large number of purposes has been materially reduced in the case of many common makes of motor vehicles. Since motor vehicles provided with individual wheel suspension do not usually have a rigid cross member such as an axle easily engageable by the supporting rails of the vehicle lift, vehicle lifting apparatus of the "free wheel" type is becoming obsolete.

An important object of this invention is to provide wheel supporting apparatus for converting a vehicle lift of the "free wheel" type into one of the "run on" type.

A further object is to provide a pair of wheel supporting platforms, one of which is fixedly secured to the supporting rails of a vehicle lift and the other of which is movable by the wheels of the vehicle relative to the supporting rails.

A further object is to provide a pair of supporting rails in vehicle lifting apparatus of the "free wheel" type with a pair of wheel supporting platforms, one of which is fixedly secured and the other of which is movable by the wheels of the vehicle to be lifted with respect to the supporting rails, and to provide mechanism for releasably securing the movable wheel supporting platform from movement along the supporting rails.

A further object is to provide novel wheel chock mechanism in wheel supporting platforms which may be used for converting lifting apparatus of the "free wheel" type into lifting apparatus of the "run on" type.

Other objects and advantages of the invention will become apparent during the course of the following description.

In the accompanying drawings I have shown one embodiment of the invention. In this showing:

Figure 1 is a side elevation showing the parts in operative position for the reception of the wheels of a motor vehicle, Figure 2 is a plan view of the apparatus, Figure 3 is an enlarged side elevation, parts being broken away, showing the apparatus in a raised position supporting the wheels of a motor vehicle, Figure 4 is a sectional view taken on line 4—4 of Figure 2, and, Figure 5 is an end view showing the apparatus in a raised position supporting the wheels of a motor vehicle.

Referring to the drawings, the numeral 11 designates as a whole a vehicle support having a pair of spaced parallel supporting rails 12. The rails 12 are connected by a plate 13 to a vertically movable member 14 such as a conventional lift plunger. Suitable apparatus (not shown) is provided for moving the member 14 vertically whereby the supporting rails may be raised or lowered relative to the surface of the ground indicated generally by the line 15.

The rails 12 are spaced apart a distance less than the distance between a pair of vehicle wheels and are engageable with the axles of a motor vehicle whereby the member 14 will be effective to raise or lower a motor vehicle positioned above the rails 12. Since the wheels of a motor vehicle will be positioned outside the supporting rails 12 and the motor vehicle will be supported through the chassis of the vehicle, this type of lifting apparatus is known as the "free wheel" type. In order to convert lifting apparatus of the "free wheel" type into that of the "run on" type wherein vertical movement of the lifting apparatus is imparted to the vehicle through the vehicle wheels, I have provided a pair of wheel supporting platforms respectively indicated as a whole by the numerals 16 and 17. Each of the wheel supporting platforms 16 and 17 is adapted to engage a pair of vehicle wheels whereby vertical movement of the supporting rails 12 will be transmitted to the vehicle being lifted directly through the vehicle wheels in a manner which will become apparent.

The supporting platforms 16 and 17 are respectively provided with a pair of transverse rails 18 and 18' and the rails of each pair are rigidly secured in parallel relationship by members 19, thus forming a framework for supporting the wheels of a motor vehicle. The undersides of the rails 18 are engageable with the uppersides of the supporting rails 12 whereby lifting movement of the supporting rails 12 will be transferred to the platforms 16 and 17. Each of the platforms 16 and 17 straddles the supporting rails 12 and is provided with a pair of individual wheel supports, to be described, spaced beyond the supporting rails 12. The platform 16 is provided with a pair of identical individual wheel supports indicated as a whole by the numeral 20. Likewise, the platform 17 is provided with a pair of individual wheel supports indicated as a whole by the numeral 21.

Each individual wheel support 20 comprises an angle iron 22 secured to the upper edge of one of the transverse members 18. A plate 23 is connected by a pivot 24 to the upper edge of the other transverse member 18. The plate 23 is provided with a lug 25 and an opening 26 for a purpose which will become apparent.

Beneath each support 20, a housing 27 is secured to the undersides of the transverse rails 18. The housing 27 rotatably carries rollers 28 whereby the platform 16 may be readily rolled along the surface of the ground 15. As best shown in Figures 1 and 4, showing the supporting rails in their lowered position with the rollers 28 resting on the surface of the ground 15, the under-surfaces of the transverse members 18 normally are spaced above the upper-surfaces of the supporting rails 12 whereby the platform 16 may be readily moved along the surface of the ground without frictional engagement of the transverse members 18 with the supporting rails 12. A pair of brackets 29 carrying guide rollers 30 are secured to the underside of each of the transverse members 18. The rollers 30 are engageable with the supporting rails 12 to maintain proper alignment of the platform 16 relative to the supporting rails 12 whereby the individual wheel supports 20 will be properly positioned.

Each individual wheel support 21 comprises a member 31 connected by a pivot 32 to the transverse rail 18' adjacent the transverse rail 18 carrying the plates 23. The member 31 is provided with an offset portion 33 which is adapted to extend through the opening 26 in overlapping relationship with the adjacent plate 23 for a purpose to be described. The member 31 is also provided with a depending member 34 engageable with the adjacent transverse rail 18' for limiting pivotal movement of the member 31 beyond a vertical position as best shown in Figure 3.

Each support 21 further comprises a wheel supporting member 35 connected to the other transverse rail 18' by a pivot 36. The supporting member 35 is provided with a depending leg 37 which will contact the surface 15 of the ground to maintain the flat surface 38 of the support 35 in a substantially horizontal position when the lift is in its lowered position as shown in Figure 1. The support 35 is provided with a groove or recess 39 adapted to receive the lug 25 of the adjacent plate 23 in a manner and for a purpose which will become apparent. The support 35 is also provided with a wheel guiding flange 40 formed on one edge thereof to insure proper positioning of the wheel on the support 35.

In order that the platform 17 may be readily moved when its use is not desired, retractable casters 41 are supported beneath the undersides of the transverse rails 18' by springs 42. The platform 17 is secured against movement relative to the rails 12 by set screws 43 having threaded engagement with brackets 44 secured to the under-surfaces of the transverse rails 18'. The springs 42 are of sufficient strength to hold the transverse rails 18' above the supporting rails 12. However, when the set screws 43 are tightened, it will be apparent that the transverse rails 18' will be drawn downwardly into tight engagement with the supporting rails 12, and the platform 17 will thereby be secured from movement relative to the supporting rails 12. Obviously, any number of well known structures could be used for fixedly securing the platform 17 from movement relative to the supporting rails 12.

A pair of run-ways 45 are connected by pivots 46 to the transverse rail 18' carrying the members 35. Each run-way 45 is aligned with one of the members 35 and is provided with a wheel guiding flange 47 adjacent one edge thereof. An abutment 48 depends from the run-way 45 below the pivot 46 and is engageable with the adjacent transverse rail 18 for limiting downward pivotal movement of the run-way 45.

The operation of the apparatus is as follows:

Assuming that the lift has been used as a conventional "free wheel" lift, the platforms 16 and 17 will have been disconnected from the lift. When it is desired to use the apparatus of the present invention, the supporting rails 12 of the lift are lowered to a position in contact with the surface 15 of the ground in order that the platforms 16 and 17 may be placed in operative position with respect to the lift. The platform 16 is then rolled into position over the rails 12 with the rollers 28 resting on the surface 15 and with the transverse members 18 thereof positioned slightly above the upper surface of the supporting rails 12. Thereafter, the platform 17 is similarly rolled into position while being supported by the casters 41 resting on the surface of the ground. When the platform 17 is in the desired position, the set screws 43 are tightened to fix the platform 17 against movement relative to the supporting rails 12. The platform 16 is now ready to be rolled into a position adjacent the platform 17.

Before bringing the platform 16 into proximity with the platform 17, the members 31 are swung to the vertical position shown in Figure 3. The plates 23 are then lifted to the position shown in Figure 3, whereupon the platform 16 is moved toward the platform 17. The off-set ends 33 of the members 31 will enter the openings 26 of the respective plates 23, whereupon the lower edges of these openings will engage the members 31 and start to swing them downwardly toward the position shown in Figure 1.

After movement of the platform 16 has taken place to a predetermined extent, the off-set portions 33 of the members 31 will engage the upper ends 50 of the openings 26, whereupon continued downward swinging movement of the members 31 will impart similar movement to the plates 23. Movement of the platform 16 toward the platform 17 will be limited by engagement of the stops 49 with the adjacent transverse member 18', at which time the plate 23 and members 31 will have reached the position shown in Figure 1 with the depending edges 25 of the plates 23 arranged in the recesses 39, as shown in Figure 1.

The apparatus is now prepared to have a vehicle placed in position thereon and the vehicle is driven onto the lift from the right hand side of the apparatus as viewed in Figures 1, 2 and 3, the front wheels 51 of the vehicle rolling up the runways 45, and then across the plates 35 and subsequently the plates 23. It will be apparent in this connection that all of the parts of the apparatus will be in the positions shown in Figure 1 when the vehicle is initially driven on to the lift.

As the front wheels of the motor vehicle pass over the pivot 24, pivotal movement of the plate 23 will take place and will continue until the wheel contacts the angle iron 22 which provides an abutment resisting further forward movement of the vehicle wheel relative to the platform 16. The position which a motor vehicle will occupy on the support 20 is diagrammatically illustrated by the wheel 51 in Figure 3. In such position, the wheels 51 are located centrally between the transverse members 18 and each plate 23 will occupy a position tangential to the corresponding wheel 51 at a point of engagement adjacent the pivot 24 in which position the plate 23 together with the abutment 22 will effectively resist movement of the wheel 51 in either direction from the wheel support 20.

As pivotal movement of the plates 23 takes place, it will be apparent that the lugs 25 will become disengaged from the notches 39 thereby releasing the platform 16 for movement away from the platform 17. At the same time the plates 25, having overlapping engagement with the offset portions 33 of the respective members 31, will effect pivotal movement of the members 31 from their horizontal position as shown in Figure 1 to a vertical position as shown in Figure 3. Movement of the member 31 beyond the vertical position will be prevented by engagement of the depending member 34 with the adjacent transverse rail 18'. As the members 31 reach vertical position, the offset portions 33 will be released from engagement with the edges 50 of the openings 26. The size and shape of the members 23 and 31 are so formed that complete pivotal movement of these parts is effected before movement of the platform 16 away from the platform 17 takes place.

After the wheels 51 are in position on the supports 20, it will be apparent that further forward movement of the vehicle relative to the supporting rails 12 will effect movement of the platform 16 on the wheels 28 away from the supports 17. Such movement of the platform 16 will continue until the rear vehicle wheels, diagrammatically illustrated by the numeral 52, roll up the runways 45 and onto the surfaces 38 of the plates 35. It will be recalled that prior to the rear wheels 52 contacting the run-ways 45, the members 31 will have been moved to a vertical position and in such position will provide an abutment preventing further forward movement of the wheels 52 and the vehicle carrying such wheels. Accordingly, it will be apparent that movement of the wheels 51 and movable platform 16 will be stopped as soon as the rear wheels 52 contact with the abutment 33.

As soon as the wheels 52 contact the abutments 31, the lift mechanism may be operated to impart a lifting movement to the supporting rails. Initial lifting movement will impart a lifting movement to the platform 17 and will take up the play between the upper sides of the supporting rails 12 and the undersides of the transverse rails 18 of the platform 16. As upward movement of the lift is continued, pivotal movement of the supporting members 35 on the platform 17 will take place and such movement will continue until the surfaces 38 of the supporting members 35 are tangential to the respective wheels 32 at points adjacent the pivots 36. The supporting members 35 with the lift in a raised position is shown in Figure 3 and it will be apparent that the plates 35 in this position will effectively prevent movement of the vehicle wheels 52 rearwardly from their supports 21 and the abutments 31 will prevent movement of the vehicle wheels 52 in the opposite direction.

As upward movement of the lift is started and continued, pivotal movement of the run-ways 45 will take place until the abutments 48 strike the transverse rail 18' carrying the pivot 46. Such pivotal movement of the run-ways 45 is desirable to insure contact of the edges 53 of the run-ways 45 with the surface of the ground when the lift is lowered.

When it is desired to remove a motor vehicle from the lift, it is merely necessary to lower the supporting rails 12 to their down position, in which position the vehicle may be driven from the lift under its own power. As the lift approaches its lower position, the lower edges 54 of the legs 37 on the supporting members 35 will contact with the ground and continued movement of the lift downwardly will effect pivotal movement of the supporting members 35 about their pivots 36 until the surface 38 occupies the horizontal position shown in Figure 1. In such position, power may be applied to the wheels 52 to roll the same off the supporting plates 35 and downwardly over the run-ways 45.

As such movement of the wheels 52 is continued, the movable platform 16 will be moved by the front wheels of the vehicle until the stops 49 contact the fixed platform 17. Continued backward movement of the vehicle will cause the wheels 51 to effect pivotal movement of the members 23 toward the abutment 31 which will have been left in an upright position. As pivotal movement of the members 23 is continued, the edges 55 of the openings 26 in the plates 23 will strike the members 31 and effect pivotal movement of such members to the horizontal position shown in Figure 1 with the offset portions 33 lying in overlapping relationship with the upper surfaces of the plates 23. Further pivotal movement of the plates 23 will be prevented by engagement of the lugs 25 in the grooves 39. The plates 25 together with the supporting members 35 and run-ways 45 will thereupon provide run-ways for the wheels 51 from the lift. By movement of the wheel 51 from the lift, the parts of the platform 16 and 17 will have been automatically restored to their initial positions and will again be operative for the reception of the wheels of another motor vehicle.

It will be apparent that the arrangement of the platform 17, fixed with respect to a pair of supporting rails of the conventional "free wheel" vehicle lift, together with the movable platform 16 provides a simple and effective apparatus for converting a lift of the "free wheel" type into one of the "run on" type. By releasably securing the movable platform 16 to the fixed platform 17, the parts of the construction provide a runway for a pair of motor vehicle wheels onto the movable platform 16 and movement of the vehicle wheels into complete engagement with the platform 16 is effective for releasing the means which latches the movable platform 16 to the fixed platform 17. It will further be apparent that the construction of the movable platform 16 and fixed platform 17 provides a novel form of chock construction which effectively prevents movement of the wheels from the platforms 16 and 17 when the lift is in raised position. The construction also is advantageous in that the parts are automatically returned to their initial position upon movement of a vehicle from the lift.

It is to be understood that the form of my invention herewith shown and described is to be taken as a preferred example of the same and that various changes in the shape, size and arrangement of parts may be resorted to without departing from the spirit of the invention or the scope of the subjoined claims.

I claim:

1. In combination with a free wheel vehicle lift having a pair of supporting rails normally engageable with the axles of a vehicle, a plurality of supporting structures carried by said rails, each of said supporting structures being engageable with a pair of vehicle wheels whereby upward movement of said rails will be imparted directly to the wheels of the vehicle, and rollers for supporting one of said structures for movement toward and away from the other structure.

2. In combination with a free wheel vehicle lift having a pair of supporting rails normally engageable with the axles of a vehicle, a plurality of supporting structures carried by said rails, each of said supporting structures being engageable with a pair of vehicle wheels whereby upward movement of said rails will be imparted directly to the wheels of the vehicle, one of said supporting structures being fixed to said rails, another of said supporting structures being movable toward and away from said first named supporting structure, said structures being constructed and arranged to provide for movement of one pair of vehicle wheels from one of said structures to another when said structures are arranged in proximity to each other.

3. In combination with a free wheel vehicle lift having a pair of supporting rails normally engageable with the axles of a vehicle, a plurality of supporting structures carried by said rails, each of said supporting structures being engageable with a pair of vehicle wheels whereby upward movement of said rails will be imparted directly to the wheels of the vehicle, one of said supporting structures being fixed to said rails, another of said supporting structures being movable toward and away from said first named supporting structure, said structures being constructed and arranged to provide for movement of one pair of vehicle wheels from one of said structures to another when said structures are arranged in proximity to each other, and means preventing movement of said movable structure away from said fixed structure when said structures are in proximity to each other.

4. In combination with a free wheel vehicle lift having a pair of supporting rails normally engageable with the axles of a vehicle, a plurality of supporting structures carried by said rails, each of said supporting structures being engageable with a pair of vehicle wheels whereby upward movement of said rails will be imparted directly to the wheels of the vehicle, one of said supporting structures being fixed to said rails, another of said supporting structures being movable toward and away from said first named supporting structure, and means preventing movement of said movable structure away from said fixed structure, said means being constructed and arranged to be automatically releasable by a pair of vehicle wheels.

5. In combination with a free wheel vehicle lift having a pair of supporting rails normally engageable with the axles of a vehicle, a plurality of supporting structures carried by said rails, each of said supporting structures being engageable with a pair of vehicle wheels whereby upward movement of said rails will be imparted directly to the wheels of the vehicle, one of said supporting structures being fixed to said rails, another of said supporting structures being movable toward and away from said first named supporting structure, means preventing movement of said movable structure away from said fixed structure, said means being constructed and arranged to be automatically releasable by a pair of vehicle wheels to permit movement of said movable structure away from said fixed structure, and a chock device on said fixed structure rendered operable by release of said means to stop forward movement of a vehicle upon movement of the other pair of vehicle wheels into engagement with said fixed structure.

6. In combination with a free wheel vehicle lift having a pair of supporting rails normally engageable with the axles of a vehicle, a plurality of supporting structures carried by said rails, each of said supporting structures being engageable with a pair of vehicle wheels whereby upward movement of said rails will be imparted directly to the wheels of the vehicle, one of said supporting structures being fixed to said rails, another of said supporting structures being movable toward and away from said first named supporting structure, and means securing said movable structure in predetermined adjacent relationship to said fixed structure whereby a pair of vehicle wheels may pass over said fixed structure into engagement with said movable structure, one of said structures having portions to facilitate movement of said vehicle wheels over said fixed structure onto said movable structure.

7. In combination with a free wheel vehicle lift having a pair of supporting rails normally engageable with the axles of a vehicle, a plurality of supporting structures carried by said rails, each of said supporting structures being engageable with a pair of vehicle wheels whereby upward movement of said rails will be imparted directly to the wheels of the vehicle, one of said supporting structures being fixed to said rails, another of said supporting structures being movable toward and away from said first named supporting structure, and means securing said movable structure in predetermined adjacent relationship to said fixed structure whereby a pair of vehicle wheels may pass over said fixed structure into engagement with said movable structure, one of said structures having portions to facilitate movement of said vehicle wheels over said fixed structure onto said movable structure, said means being constructed and arranged to be automatically releasable by movement of said wheels to permit movement of said movable structure by said wheels away from said fixed structure.

8. In combination with a free wheel vehicle lift having a pair of supporting rails normally engageable with the axles of a vehicle, a plurality of supporting structures carried by said rails, each of said supporting structures being engageable with a pair of vehicle wheels whereby upward movement of said rails will be imparted directly to the wheels of the vehicle, one of said supporting structures being fixed to said rails, another of said supporting structures being movable toward and away from said first named supporting structure, means securing said movable structure in predetermined adjacent relationship to said fixed structure whereby a pair of vehicle wheels may pass over said fixed structure into engagement with said movable structure, one of said structures having portions to facilitate movement of said vehicle wheels over said fixed structure onto said movable structure, said means being constructed and arranged to be automatically releasable by movement of said wheels to permit movement of said movable structure by said wheels away from said fixed structure, and a chock device on said fixed structure rendered operable by release of said means to act as an abutment to stop forward movement of a vehicle upon movement of another pair of wheels thereof into engagement with said fixed structure.

9. Apparatus of the character described comprising a pair of supporting rails, and a plurality of supporting structures supported by said rails, each of said structures providing a support for a pair of vehicle wheels, one of said structures being movable along said rails and another of said structures occupying a fixed position relative to said rails, said structures being constructed and arranged to provide for movement of one pair of vehicle wheels from one of said structures to another when said structures are arranged in proximity to each other.

10. Apparatus of the character described comprising a pair of supporting rails, a plurality of supporting structures supported by said rails, each of said structures providing a support for a pair of vehicle wheels, one of said structures being movable along said rails and another of said structures occupying a fixed position relative to said rails, said structures being constructed and arranged to provide for movement of one pair of vehicle wheels from one of said structures to another when said structures are arranged in proximity to each other, and means for preventing movement of said movable structure relative to said rails and said fixed structure when said structures are in proximity to each other.

11. Apparatus of the character described comprising a pair of supporting rails, a plurality of supporting structures supported by said rails, each of said structures providing a support for a pair of vehicle wheels, one of said structures being movable along said rails and another of said structures occupying a fixed position relative to said rails, and means for preventing movement of said movable structure relative to said rails and said fixed structure, said means being constructed and arranged to be releasable by a pair of vehicle wheels to permit movement thereof along said rails.

12. Apparatus of the character described comprising a pair of supporting rails, a plurality of supporting structures supported by said rails, each of said structures providing a support for a pair of vehicle wheels, one of said structures being movable along said rails and another of said structures occupying a fixed position relative to said rails, and a chock device on said fixed structure rendered operable by a pair of vehicle wheels to act as an abutment for the other pair of said wheels.

13. Apparatus of the character described comprising a pair of supporting rails, a plurality of supporting structures supported by said rails, each of said structures providing a support for a pair of vehicle wheels, one of said structures being movable along said rails and another of said structures occupying a fixed position relative to said rails, and means for preventing movement of said movable structure relative to said rails and said fixed structure, said means being constructed and arranged to be releasable by a pair of vehicle wheels to permit movement thereof along said rails, and a chock device on said fixed structure rendered operable by a pair of vehicle wheels to act as an abutment for preventing forward movement of said vehicle upon movement of another pair of vehicle wheels into engagement with said fixed structure.

14. In an apparatus of the character described, a vehicle wheel supporting platform, an abutment carried by one edge of said platform, and a pivoted member secured to the other edge of said platform, said pivoted member providing a run-way for a vehicle wheel onto said platform and arranged to be pivotally movable upon movement of said wheel into engagement with said abutment to a position resisting movement of said wheel in one direction from said platform.

15. In an apparatus of the character described, a vehicle wheel supporting platform having a pair of transverse supporting members, an abutment secured to one of said transverse members, and a pivoted member carried by the other of said transverse members, said pivoted member providing a run-way for a vehicle wheel to a position between said transverse members and arranged to be pivotally movable upon movement of said wheel into engagement with said abutment to a position resisting movement of said wheel in one direction from said platform.

16. In an apparatus of the character described, a vertically movable vehicle wheel supporting platform, a pivoted member carried by one edge of said platform, a pivoted wheel supporting member carried by the other edge of said platform, said members being normally arranged to permit movement of a vehicle wheel in one direction over and past said platform, and means operative upon movement of a vehicle wheel in said direction over and past said platform for effecting pivotal movement of said first mentioned member to an upright position thereby providing an abutment preventing further forward movement of a vehicle upon movement of another vehicle wheel onto said platform, said second named member being pivotally depressible to a position resisting movement of a vehicle wheel in the other direction from said platform upon movement of said platform to a raised position.

17. In an apparatus of the character described, a vehicle wheel supporting platform, a plurality of rollers normally supporting said platform for movement over a plane surface, an abutment secured to one edge of said platform, a pivoted member secured to the other edge of said platform, a member having a groove formed therein, and a lug formed on said pivoted member engageable with said groove to prevent movement of said platform, said pivoted member providing a run-way for a vehicle wheel onto said platform and arranged to be pivotally movable by said wheel to a position resisting movement of said wheel from said platform and to release said lug from engagement with said groove to permit movement of said platform by said wheel.

18. Apparatus of the character described comprising a pair of supporting rails, a pair of vehicle wheel supporting platforms, one of said platforms being movable along said rails and the other of said platforms being fixed against movement with respect to said rails, a plate pivoted to an edge of said movable platform adjacent said fixed platform and having a portion thereof extending over said fixed platform, said fixed platform having a groove formed therein, a lug formed on said extended portion of said plate and engageable with said groove to prevent movement of said movable platform, said plate providing a vehicle wheel run-way from said fixed platform to said movable platform and being pivotally movable upon movement of a vehicle wheel into position on said movable platform to a position resisting movement of said wheel from said platform and effecting release of said lug from said groove.

19. Apparatus of the character described comprising a pair of supporting rails, a pair of vehicle wheel supporting platforms, one of said platforms being movable along said rails and the other of said platforms being fixed against movement with respect to said rails, a plate pivoted to an edge of said movable platform adjacent said fixed platform and having a portion thereof extending over said fixed platform, and an abutment pivoted to an edge of said fixed platform adjacent said movable platform and releasably engaging said plate for pivotal movement to an upright position upon pivotal movement of said plate, said plate providing a vehicle run-way from said fixed to said movable platform and being pivotally movable by movement of a vehicle wheel into position on said movable platform to a position resisting movement of said wheel from said platform.

20. Apparatus of the character described comprising a pair of supporting rails, a pair of vehicle wheel supporting platforms, one of said platforms being movable along said rails and the other of said platforms being fixed against movement with respect to said rails, a plate pivoted to an edge of said movable platform adjacent said fixed platform and having a portion thereof extending over said fixed platform, and an abutment pivoted to an edge of said fixed platform adjacent said movable platform and releasably engaging said plate for pivotal movement to an upright position upon pivotal movement of said plate, said fixed platform having a groove formed therein, a lug formed on said extended portion of said plate and engageable with said groove to prevent movement of said movable platform, said plate providing a vehicle wheel run-way from said fixed platform to said movable platform and being pivotally movable by movement of a vehicle wheel into position on said movable platform to a position resisting movement of said wheel from said platform and effecting release of said lug from said groove.

21. Apparatus of the character described comprising a pair of supporting rails, a pair of vehicle wheel supporting platforms, one of said platforms being movable along said rails and the other of said platforms being fixed against movement with respect to said rails, a plate pivoted to an edge of said movable platform adjacent said fixed platform and having a portion thereof extending over said fixed platform, and an abutment pivoted to an edge of said fixed platform adjacent said movable platform, said plate being provided with an opening through which said abutment extends in overlapping relationship with respect thereto whereby said abutment will be pivotally movable to an upright position upon pivotal movement of said plate, said plate further providing a vehicle run-way from said fixed to said movable platform and being pivotally movable by movement of a vehicle wheel into position on said movable platform to a position resisting movement of said wheel from such platform.

22. In an apparatus of the character described, a pair of supporting rails, a pair of vehicle wheel supporting structures one of which is arranged to be fixed with respect to said rails and the other of which is constructed and arranged to move longitudinally of said rails, and a common device constructed and arranged to prevent movement of said movable structure away from said fixed structure and to serve as a chock for a wheel on said movable structure.

23. In an apparatus of the character described, a pair of supporting rails, a pair of vehicle wheel supporting structures one of which is arranged to be fixed with respect to said rails and the other of which is constructed and arranged to move longitudinally of said rails, and a common device constructed and arranged to prevent movement of said movable structure away from said fixed structure and to serve as a chock for a wheel on said movable structure, said common means comprising a plate serving as a runway over which one pair of vehicle wheels is adapted to roll from one of said structures to the other.

24. In an apparatus of the character described, a pair of supporting rails, a pair of vehicle wheel supporting structures one of which is arranged to be fixed with respect to said rails and the other of which is constructed and arranged to move longitudinally of said rails, a common device constructed and arranged to prevent movement of said movable structure away from said fixed structure and to serve as a chock for a wheel on said movable structure, said common device being movable to chocking position by the passage thereover of at least one of a pair of vehicle wheels, and means operable by movement of said common device to chocking position for chocking at least one of the other pair of vehicle wheels on said fixed structure.

25. In an apparatus of the character described, a pair of supporting rails, a pair of vehicle wheel supporting structures one of which is arranged to be fixed with respect to said rails and the other of which is constructed and arranged to move longitudinally of said rails, a common device constructed and arranged to prevent movement of said movable structure away from said fixed structure and to serve as a chock for a wheel on said movable structure, said common device being movable to chocking position by the passage thereover of at least one of a pair of vehicle wheels, and means operable by movement of said common device to chocking position for chocking at least one of the other pair of vehicle wheels on said fixed structure, said common device comprising a plate occupying a predetermined position when preventing movement of said movable structure away from said fixed structure and serving in such position as a runway for a pair of vehicle wheels moving from one of said structures to the other.

PHILIP J. KROLL.